United States Patent
Song

(10) Patent No.: US 8,840,749 B2
(45) Date of Patent: Sep. 23, 2014

(54) SYSTEM AND METHOD FOR SEALING A HEMMED CLOSURE

(75) Inventor: Guangling Song, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 658 days.

(21) Appl. No.: 13/021,819

(22) Filed: Feb. 7, 2011

(65) Prior Publication Data

US 2012/0202013 A1    Aug. 9, 2012

(51) Int. Cl.
```
B29C 65/00    (2006.01)
B29C 65/48    (2006.01)
B32B 37/00    (2006.01)
B21D 39/02    (2006.01)
B32B 27/28    (2006.01)
B32B 7/12     (2006.01)
B32B 27/32    (2006.01)
```

(52) U.S. Cl.
CPC .............. *B21D 39/02* (2013.01); *B32B 27/283* (2013.01); *B32B 2605/003* (2013.01); *B32B 7/12* (2013.01); *B32B 2605/00* (2013.01); *B32B 27/322* (2013.01)
USPC ........... 156/295; 156/202; 156/212; 156/216; 156/290; 156/310; 156/314; 29/243.58; 29/469.5; 29/509

(58) Field of Classification Search
USPC ......... 156/202, 204, 216, 223, 227, 196, 212, 156/221, 222, 290, 291, 295, 310, 314, 156/315; 29/243.58, 458, 469.5, 509, 29/527.1, 527.4
See application file for complete search history.

(56) References Cited

U.S. PATENT DOCUMENTS

| | | | | |
|---|---|---|---|---|
| 5,273,606 A | * | 12/1993 | Greve et al. | 156/216 |
| 5,749,992 A | * | 5/1998 | Eklund et al. | 156/212 |
| 5,915,781 A | * | 6/1999 | DeRees | 296/203.01 |
| 6,291,036 B1 | * | 9/2001 | Wang et al. | 428/34 |
| 6,523,244 B1 | * | 2/2003 | Bissonnette | 29/509 |
| 6,749,254 B1 | * | 6/2004 | Kleven et al. | 296/191 |

* cited by examiner

*Primary Examiner* — John Goff
*Assistant Examiner* — Hannuri L Kwon
(74) *Attorney, Agent, or Firm* — Quinn Law Group, PLLC

(57) ABSTRACT

A sealed hemmed closure assembly includes an inner panel having a first face and a second face, and an outer panel having a panel portion and a hemming portion. The second face of the inner panel substantially opposes the first face, and the hemming portion of the outer panel is disposed proximate an edge of the outer panel. The panel portion of the outer face is configured to abut the first face of the inner panel, and the hemming portion is configured to abut the second face of the inner panel. An adhesive material is disposed between the panel portion of the outer panel and the first face of the inner panel, and a sealant material is disposed between the hemming portion of the outer panel and the second face of the inner panel.

9 Claims, 2 Drawing Sheets

SYSTEM AND METHOD FOR SEALING A HEMMED CLOSURE

TECHNICAL FIELD

The present invention relates generally to sealing techniques to prevent fluid ingress at a hemmed closure.

BACKGROUND

Within the manufacturing arts, "hemming" is a term that is used to refer to the process of rolling the edge of a workpiece over onto itself. This process is often performed with metals, such as sheet metal panels, to reinforce the edge, hide burrs or rough edges, conceal any sharp edges, or generally to improve the appearance of the panel.

Within the automotive industry, the hemming process may be used to join two panels together to form a unitary structure. When joining two panels together, the hemming process may include positioning an inner and outer panel in an adjacent arrangement, and then rolling an edge of the outer panel over the edge of the inner panel. Exemplary hemmed structures may include vehicle doors, hoods, and trunk lids.

SUMMARY

A sealed hemmed closure assembly may include an inner panel that has a first face and a second face, where the second face substantially opposes the first face, and an outer panel that has both a panel portion and a hemming portion. The hemming portion of the outer panel may be disposed proximate to an edge of the outer panel, and when hemmed, the panel portion may be configured to abut the first face of the inner panel, and the hemming portion is configured to abut the second face of the inner panel. During the hemming process, the outer panel may be configured to fold about an edge of the inner panel The assembly may further include an adhesive material disposed between the panel portion of the outer panel and the first face of the inner panel, and a sealant material disposed between the hemming portion of the outer panel and the second face of the inner panel. A second sealant material may be provided between the panel portion of the outer panel and the first face of the inner panel, such that the adhesive is disposed between the first and second sealant materials along the outer panel.

Each of the sealant materials may have hydrophobic properties, and may include, for example, a silicone, fluoroelastomer, or polytetrafluoroethylene material. The sealant materials may be in compression between the inner panel and outer panel, and may also provide a waterproof seal between the inner panel and outer panel. In an embodiment, the sealant materials may provide a confined area, between which the adhesive may be allowed to spread. The adhesive material may be allowed to extend around the edge of the inner panel and be disposed between the hemming portion of the outer panel and the second surface of the inner panel.

A method of sealing a hemmed closure assembly includes providing an outer panel having a panel portion and a hemming portion, wherein the hemming portion is disposed proximate an edge of the outer panel, and applying a first sealant material to the hemming portion of the outer panel. Additionally, a second sealant material may be applied to the panel portion of the outer panel, and an adhesive material may be applied to a portion of the outer panel between the first sealant material and the second sealant material.

An inner panel may be provided that has both a first face and a second face, where the second face substantially opposing the first face. During the hemming process, the hemming portion of the outer panel may be folded about an edge of the inner panel such that the first sealant material abuts the first face, and the second sealant material abuts the second face.

The above features and advantages and other features and advantages of the present invention are readily apparent from the following detailed description of the best modes for carrying out the invention when taken in connection with the accompanying drawings.

DETAILED DESCRIPTION

Figure 1:
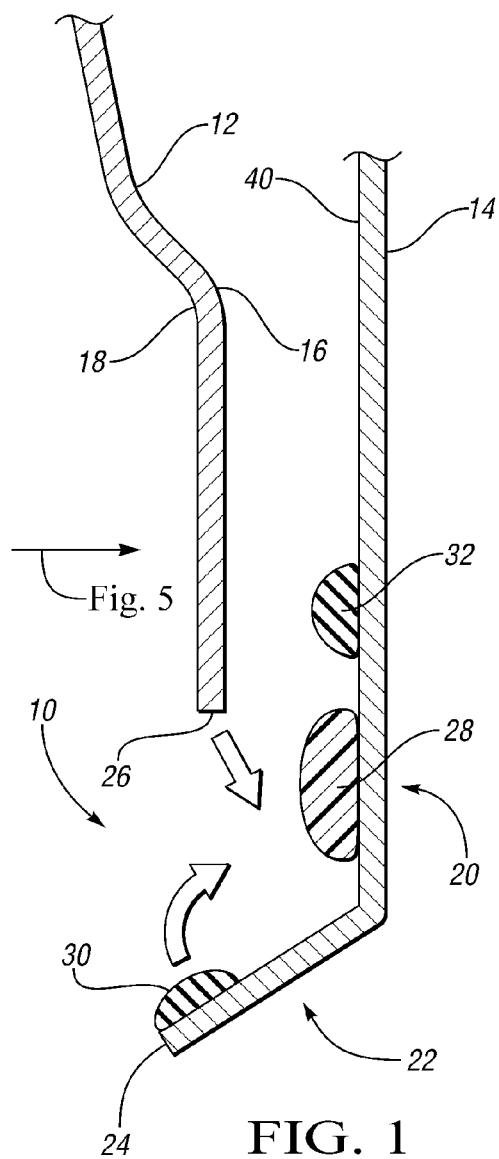
FIG. 1 is a schematic cross-sectional view of a hemmed closure assembly prior to being hemmed.
Figure 2:
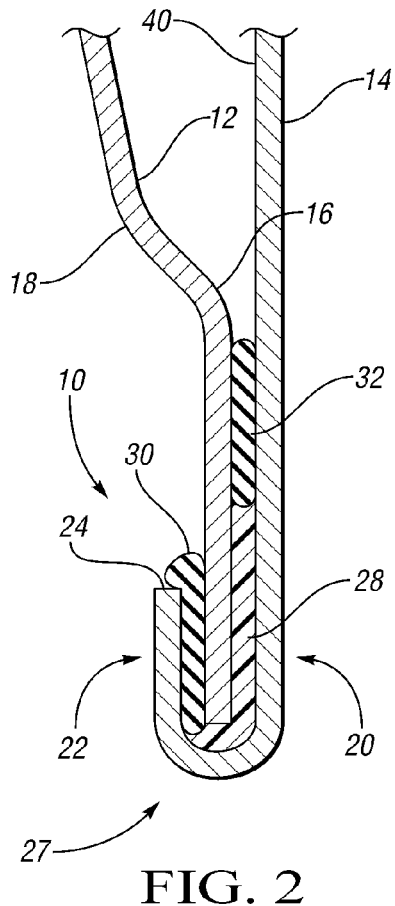
FIG. 2 is a schematic cross-sectional view of a hemmed closure assembly after being hemmed.

Referring to the drawings, wherein like reference numerals are used to identify like or identical components in the various views, FIGS. 1 and 2 illustrate a hemmed closure 10 that is used to join an inner panel 12 to an outer panel 14. The inner panel 12 may include a first face 16 that generally faces the outer panel 14, and a second face 18 that generally faces away from the outer panel 14. The outer panel 14 may have a panel portion 20 and a hemming portion 22. In general, the hemming portion 22 may be located closer to an edge 24 of the outer panel 14 than the panel portion 20. During the hemming process, the hemming portion 22 of the outer panel 14 may be bent or folded around an edge 26 of the inner panel 12 such that the panel portion 20 and hemming portion 22 each abut a different face of the inner panel 12. This may result in a "J"-shaped bend in the outer panel 14, also referred to as a "hem" 27.

During the hemming process, the hemming portion 22 of the outer panel 14 may be folded over the inner panel 12 to such a degree that the hem 27 may apply a compressive load to the inner panel 12. In an embodiment, the compressive load may be sufficient to prevent the inner panel 12 from freely withdrawing from the hem 27. The compressive load may be applied through one or more intermediate materials that may be sandwiched between the inner and outer panel. In an embodiment, an adhesive material 28 may be provided between the inner panel 12 and outer panel 14 to similarly restrain the inner panel 12 within the hem 27.

In an embodiment, one or more seals may be provided between the inner and outer panels 12, 14 to prevent environmental elements, such as rain, from entering the hem 27. The use of sealing material may inhibit the onset of material corrosion by preventing corrosive fluid from collecting within the hem 27.

As illustrated in FIGS. 1 and 2, a first sealing material 30 may be applied near the edge 24 of the outer panel 14, such as on the hemming portion 22. When the outer panel 14 is folded about the inner panel 12, the first sealing material 30 may provide a seal between the outer panel 14 and the face 18 of the inner panel 12. The existence of the sealing material 30 may inhibit fluids from entering the hem 27 between the hemming portion 22 and the inner panel 12. In an embodiment, a second sealing material 32 may be applied to the panel portion 20 of the outer panel 14. When the face 16 of the inner panel 12 is placed into contact with the second sealing material 32, the sealing material 32 may inhibit fluids from entering the hem 27 through the interface of the panel portion 20 and the inner panel 12.

The first and second sealing materials 30, 32 may be made from the same type of material, or from materials that have similar material properties. Each sealing material 30, 32 may preferably have hydrophobic qualities that can enhance its sealing characteristics. In an embodiment, once applied to the outer panel 14, the sealing materials 30, 32 may be cured, or partially-cured to a degree where they may have a generally tacky surface texture yet may be able to receive and maintain an elastic loading. The cured nature of the sealing materials 30, 32 may restrain the materials from excessively squeezing out from the hem 27 in a manner where it could contaminate or adhere to the assembly tooling. Exemplary sealing materials may include rubber, silicone, fluoroelastomers, and/or polytetrafluoroethylene (PTFE).

As illustrated in FIG. 2, when the hemming portion 22 of the outer panel 14 is brought into close proximity with the outward facing surface 18 of the inner panel 12, the first sealing material 30 may be compressed and may protrude beyond the edge 24 of the outer panel 14. Such a protrusion may reduce the likelihood that voids may form between the inner and outer panels 12, 14, within which fluid may collect.

Figure 3:
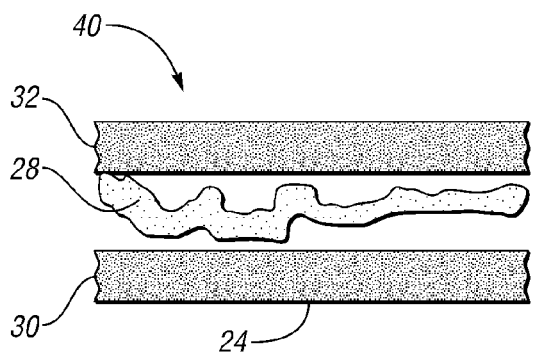
FIG. 3 is a schematic surface profile view of an outer panel of a hemmed closure assembly, prior to being hemmed.
Figure 4:
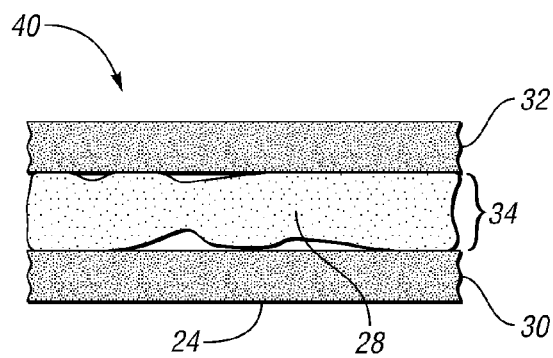
FIG. 4 is a schematic surface profile view of an outer panel of a hemmed closure assembly, after being hemmed.

FIGS. 3 and 4 illustrate a view of the inward-facing surface 40 of the outer panel 14, as perceived from a direction normal to the surface. FIG. 3 generally represents the panel prior to hemming (as also generally illustrated in FIG. 1), and FIG. 4 generally represents the panel after hemming (as also generally illustrated in FIG. 2). As illustrated in FIGS. 3 and 4, the adhesive material 28 may be positioned along the inward-facing surface 40 of the outer panel 14 between the first sealant material 30 and the second sealant material 32. When applied, the adhesive material 28 may have an irregular pattern as shown in FIG. 3. This may be caused, for example, by the viscous properties of the adhesive 28.

As the panel is hemmed, such as shown in FIGS. 2 and 4, compression forces generated between the outer panel 14 and inner panel 12 may cause the sealant materials 30, 32 to elastically expand, and may further cause the adhesive 28 to flow throughout an area 34 between the first and second sealant materials 30, 32. In this manner, the first and second sealant materials 30, 32 may cooperate with the inner and outer panels 12, 14 to sufficiently impede the adhesive 28 from spreading beyond the provided area 34. By restraining the outward flow of the adhesive 28 within the provided area 34, the assembly may reduce the likelihood that any assembly tooling used in the hemming procedure may be contaminated by the adhesive. Also, by restraining the outward flow of the adhesive 28, the design may promote a more uniform distribution of adhesive 28 within the hem 27.

Figure 5:
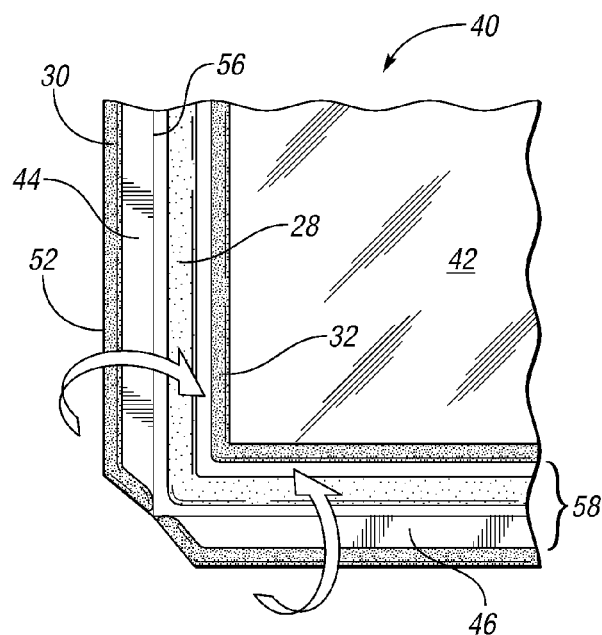
FIG. 5 is a schematic profile view of an outer panel of a hemmed closure assembly, prior to being hemmed.
Figure 6:
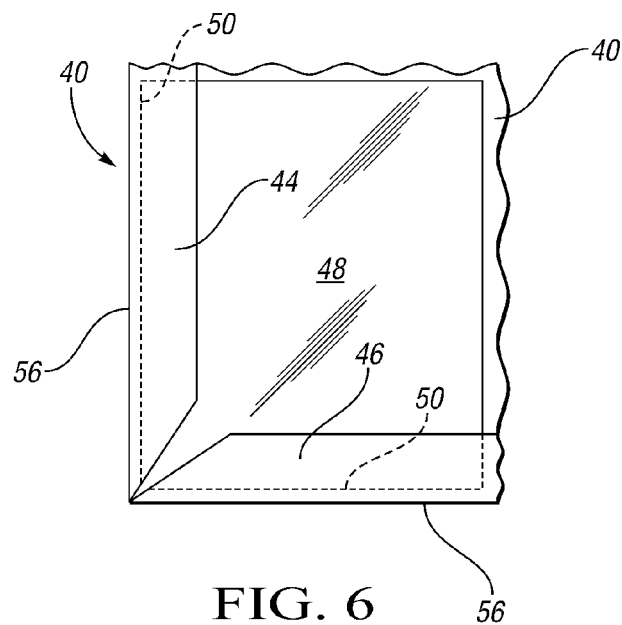
FIG. 6 is a schematic profile view of a hemmed closure assembly after being hemmed.

FIG. 5 generally illustrates an outer panel 40 that may be used to provide a hemmed closure. The outer panel 40 shown in FIG. 5 may be similar to the outer panel 14 provided in FIGS. 1 and 2 when viewed from a direction such as designated by arrow "FIG. 5," shown in FIG. 1. As illustrated, the outer panel 40 may include a panel portion 42, a first hemming portion 44, and a second hemming portion 46. As generally shown in FIG. 6, an inner panel 48 may be hemmed with the outer panel 40, where the inner panel 48 may abut the panel portion 42 of the outer panel 40. To join the inner and outer panels, 48, 40, each of the first and second hemming portions 44, 46 may generally be folded about a hemming edge 56 of the outer panel 40, and over the edge 50 of the inner panel 48. This is also generally represented by the schematic folding arrows in FIG. 5.

Referring again to FIG. 5, a first sealant material 30 may be disposed on each of the first and second hemming portions 44, 46 of the outer panel 40, and proximate to an edge 52 of the panel 40. The first sealant material 30 may serve to inhibit fluid flow into the hem from between the hemming portions 44, 46 of the outer panel 40 and the inner panel 48. Additionally, a second sealant material 32 may be disposed on the panel portion 42 of the outer panel 40 in a manner that generally follows the edge 56 of the panel portion 42. Likewise, the second sealant material 32 may serve to inhibit fluid flow into the hem from between the panel portions 42 of the outer panel 40 and the inner panel 48. As described above, the first and/or second sealing materials 30, 32 may preferably have hydrophobic properties, and may be sufficiently cured to maintain a compressive loading when hemmed with an inner panel 48.

An adhesive material 28 may be disposed between the first and second sealant materials 30, 32, and may serve to affix the inner and outer panels 40, 48 together. The adhesive material 28 may be disposed, for example, on the panel portion 42 of the outer panel 40. It is contemplated that during application, some of the adhesive material 28 may extend onto a hemming portion of the outer panel 40. Once the outer panel 40 is hemmed (as generally shown in FIG. 6), compression forces between the outer and inner panels 40, 48 may cause the adhesive material 28 to flow within the hem, though may be confined in a range 58 between the two sealant materials 30, 32.

Figure 7:
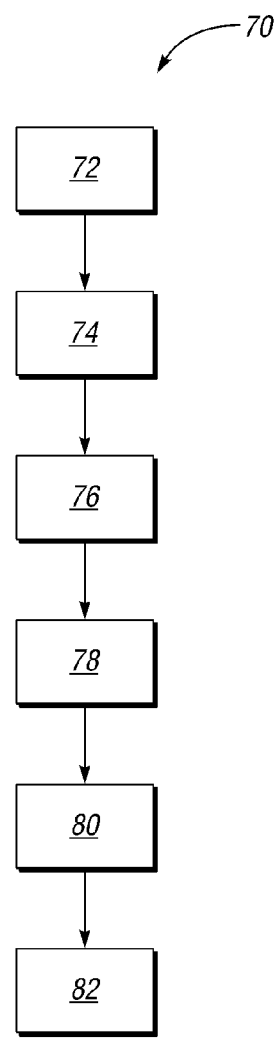
FIG. 7 is a flow diagram of a method of sealing a hemmed closure assembly.

FIG. 7 illustrates an exemplary method 70 for sealing a hemmed closure assembly. As shown, the method 70 includes first providing an outer panel that includes a panel portion and a hemming portion (Step 72). As described above, the hemming portion may be disposed proximate an edge of the outer panel. Subsequently, a first sealant material may be applied to the hemming portion of the outer panel (Step 74), a second sealant material may be applied to the panel portion of the outer panel (Step 76), and an adhesive material may be applied to a portion of the outer panel between the first sealant material and the second sealant material (Step 78). Once the sealants and adhesive have been applied, an inner panel may be provided that has a first face and a second face, where the second face substantially opposes the first face (Step 80). As described above, the inner panel may be positioned in a manner to abut the panel portion of the outer panel. Finally the outer panel may be folded about an edge of the inner panel such that the first sealant material abuts the first face, and the second sealant material abuts the second face (Step 82).

While the best modes for carrying out the invention have been described in detail, those familiar with the art to which this invention relates will recognize various alternative designs and embodiments for practicing the invention within the scope of the appended claims. All directional references (e.g., upper, lower, upward, downward, left, right, leftward, rightward, above, below, vertical, and horizontal) are only used for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not as limiting.

The invention claimed is:

1. A method of sealing a hemmed closure assembly comprising:
providing an outer panel having a panel portion and a hemming portion, the hemming portion disposed proximate an edge of the outer panel;
applying a first sealant material to the hemming portion of the outer panel;
applying a second sealant material to the panel portion of the outer panel;
applying an adhesive material to a portion of the outer panel between the first sealant material and the second sealant material;
providing an inner panel having a first face and a second face, the second face substantially opposing the first face;
folding the outer panel about an edge of the inner panel such that the first sealant material abuts the first face, and the second sealant material abuts the second face;
wherein folding the outer panel about an edge of the inner panel applies a compression force to the adhesive material; and
wherein the compression force applied to the adhesive material causes the adhesive material to flow throughout an area bounded between the first sealant material and the second sealant material.

2. The method of claim 1, wherein the first and second sealant materials are materials having elastic and hydrophobic properties.

3. The method of claim 1, wherein the first and second sealant materials include a silicone, fluoroelastomer, or polytetrafluoroethylene material.

4. The method of claim 1, wherein each of the first and second sealant materials provide a waterproof seal between the inner panel and the outer panel.

5. The method of claim 1, wherein folding the outer panel about the edge of the inner panel causes the first and second sealant materials to be placed in compression between the inner panel and outer panel.

6. The method of claim 1, wherein the first sealant material and the second sealant material impede the adhesive material from flowing outside the area.

7. The method of claim 1, wherein the first sealant material impedes the adhesive material from flowing beyond the edge of the outer panel.

8. The method of claim 1, wherein folding the outer panel about the edge of the inner panel applies the compression force to the first sealant material; and
wherein the compression force applied to the first sealant material causes the first sealant material to elastically expand and protrude beyond the edge of the outer panel.

9. The method of claim 1, wherein the first sealant material and the second sealant material are cured or partially-cured such that they may maintain an elastic loading.

* * * * *